US012705817B2

(12) United States Patent
Rose

(10) Patent No.: US 12,705,817 B2
(45) Date of Patent: Aug. 11, 2026

(54) HIGH ACCURACY TEXTURE FILTERING IN COMPUTER GRAPHICS

(71) Applicant: Imagination Technologies Limited, Kings Langley (GB)

(72) Inventor: Thomas Rose, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 16/369,978

(22) Filed: Mar. 29, 2019

(65) Prior Publication Data

US 2019/0311519 A1 Oct. 10, 2019

(30) Foreign Application Priority Data

Apr. 5, 2018 (GB) ..................................... 1805610

(51) Int. Cl.

| | |
|---|---|
| ***G06T 15/04*** | (2011.01) |
| ***G06F 5/01*** | (2006.01) |
| ***G06F 9/38*** | (2018.01) |
| ***G06T 15/00*** | (2011.01) |
| *G06F 7/499* | (2006.01) |

(52) U.S. Cl.

CPC .............. *G06T 15/04* (2013.01); *G06F 5/012* (2013.01); *G06F 9/3877* (2013.01); *G06T 15/005* (2013.01); *G06F 7/49915* (2013.01)

(58) Field of Classification Search

None

See application file for complete search history.

(56) References Cited

U.S. PATENT DOCUMENTS

| | | | | |
|---|---|---|---|---|
| 5,949,920 | A | 9/1999 | Jordan et al. | |
| 7,071,937 | B1 | 7/2006 | Collodi | |
| 7,773,092 | B1 * | 8/2010 | Heckbert | G09G 5/393 382/254 |
| 8,502,832 | B2 | 8/2013 | Buchner et al. | |
| 9,367,948 | B2 | 6/2016 | Peng et al. | |
| 2005/0237337 | A1 * | 10/2005 | Leather | G06T 15/005 345/582 |
| 2007/0008333 | A1 * | 1/2007 | Xu | G06T 15/04 345/582 |
| 2009/0295819 | A1 * | 12/2009 | Buchner | G06T 15/04 345/581 |

(Continued)

*Primary Examiner* — Aaron M Richer

(74) *Attorney, Agent, or Firm* — Potomac Law Group, PLLC; Vincent M DeLuca

(57) ABSTRACT

A texture filtering unit has inputs arranged to receive at least two texture values each clock cycle and a plurality of filter coefficients, the plurality of filter coefficients relating to a plurality of different texture filtering methods; hardware logic arranged to convert the input texture values to fixed-point representation; a coefficient merging logic block arranged to generate a single composite filter coefficient for each input texture value from the plurality of filter coefficients; one multiplier for each input texture value, wherein each multiplier is arranged to multiply one of the input texture values by its corresponding single composite filter coefficient; an addition unit arranged to add together outputs from each of the multipliers; hardware logic arranged to convert an output from the addition unit back to floating-point format; and an output arranged to output the converted output from the addition unit.

15 Claims, 7 Drawing Sheets

(56) References Cited

U.S. PATENT DOCUMENTS

| | | | | |
|---|---|---|---|---|
| 2012/0200582 | A1* | 8/2012 | Dutton | G06T 1/20 345/522 |
| 2014/0050417 | A1* | 2/2014 | Jiang | G06T 5/002 382/261 |
| 2015/0130818 | A1 | 5/2015 | Peng et al. | |
| 2018/0321938 | A1* | 11/2018 | Boswell | G06F 9/30036 |

* cited by examiner

HIGH ACCURACY TEXTURE FILTERING IN COMPUTER GRAPHICS

BACKGROUND

In 3D computer graphics, much of the information contained within a scene is encoded as surface properties of 3D geometry. Texture mapping, which is an efficient technique for encoding this information as bitmaps, is therefore an integral part of the process of rendering an image. It is not usually possible to read directly from textures as the projection of 3D geometry often requires some form of resampling and as a result, as part of rendering a scene, a graphics processing unit (GPU) performs texture filtering. This may, for example, be because the pixel centres (in the rendered scene) do not align with the texel centres in the texture (where a texture comprises an array of texels, such that texels in a texture are analogous to the pixels in an image) and in different situations, pixels can be larger or smaller than texels.

There are many different methods for texture filtering, including volumetric, anisotropic and trilinear filtering and in various examples, these methods may be applied in various combinations. Filtering can be a computationally expensive operation and any errors in the filtering, such as rounding errors, can result in visual artefacts in the rendered scene.

The embodiments described below are provided by way of example only and are not limiting of implementations which solve any or all of the disadvantages of known methods of implementing texture filtering in hardware.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A texture filtering unit is described that comprises inputs arranged to receive at least two texture values each clock cycle and a plurality of filter coefficients, the plurality of filter coefficients relating to a plurality of different texture filtering methods; hardware logic arranged to convert the input texture values to fixed-point format representation; a coefficient merging logic block arranged to generate a single composite filter coefficient for each input texture value from the plurality of filter coefficients; one multiplier for each input texture value, wherein each multiplier is arranged to multiply one of the input texture values by its corresponding single composite filter coefficient; an addition unit arranged to add together outputs from each of the multipliers; hardware logic arranged to convert an output from the addition unit back to floating-point format; and an output arranged to output the converted output from the addition unit.

A first aspect provides a texture filtering unit implemented in hardware logic, the texture filtering unit comprising: a plurality of inputs arranged to receive at least two texture values each clock cycle and a plurality of filter coefficients, the plurality of filter coefficients comprising coefficients relating to a plurality of different texture filtering methods; format conversion logic arranged to convert the input texture values from floating-point format to a fixed-point significand and an exponent; a coefficient merging logic block arranged to generate a single composite filter coefficient for each input texture value from the plurality of filter coefficients; one multiplier for each input texture value, wherein each multiplier is arranged to multiply the significand of one of the input texture values by its corresponding single composite filter coefficient; an addition unit arranged to add together outputs from each of the multipliers; hardware logic arranged to convert an output from the addition unit from fixed-point format to floating-point format; and an output arranged to output the converted output from the addition unit.

A second aspect provides a method of performing texture filtering in hardware logic, the method comprising: receiving, in a texture filtering unit, at least two texture values each clock cycle and a plurality of filter coefficients, the plurality of filter coefficients comprising coefficients relating to a plurality of different texture filtering methods; converting the input texture values from floating-point format to a fixed-point significand and an exponent; generating a single composite filter coefficient for each input texture value from the plurality of filter coefficients; in each of a plurality of multipliers, multiplying the significand of one of the input texture values by its corresponding single composite filter coefficient, wherein the plurality of multipliers comprises one multiplier for each input texture value received in a clock cycle; adding together outputs from each of the multipliers and converting the result from fixed-point format to floating-point format; and outputting the converted result.

The texture filtering unit described herein may be embodied in hardware on an integrated circuit. There may be provided a method of manufacturing, at an integrated circuit manufacturing system, a texture filtering unit. There may be provided an integrated circuit definition dataset that, when processed in an integrated circuit manufacturing system, configures the system to manufacture a texture filtering unit. There may be provided a non-transitory computer readable storage medium having stored thereon a computer readable description of an integrated circuit that, when processed, causes a layout processing system to generate a circuit layout description used in an integrated circuit manufacturing system to manufacture a texture filtering unit.

There may be provided an integrated circuit manufacturing system comprising: a non-transitory computer readable storage medium having stored thereon a computer readable integrated circuit description that describes the texture filtering unit; a layout processing system configured to process the integrated circuit description so as to generate a circuit layout description of an integrated circuit embodying the texture filtering unit; and an integrated circuit generation system configured to manufacture the texture filtering unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
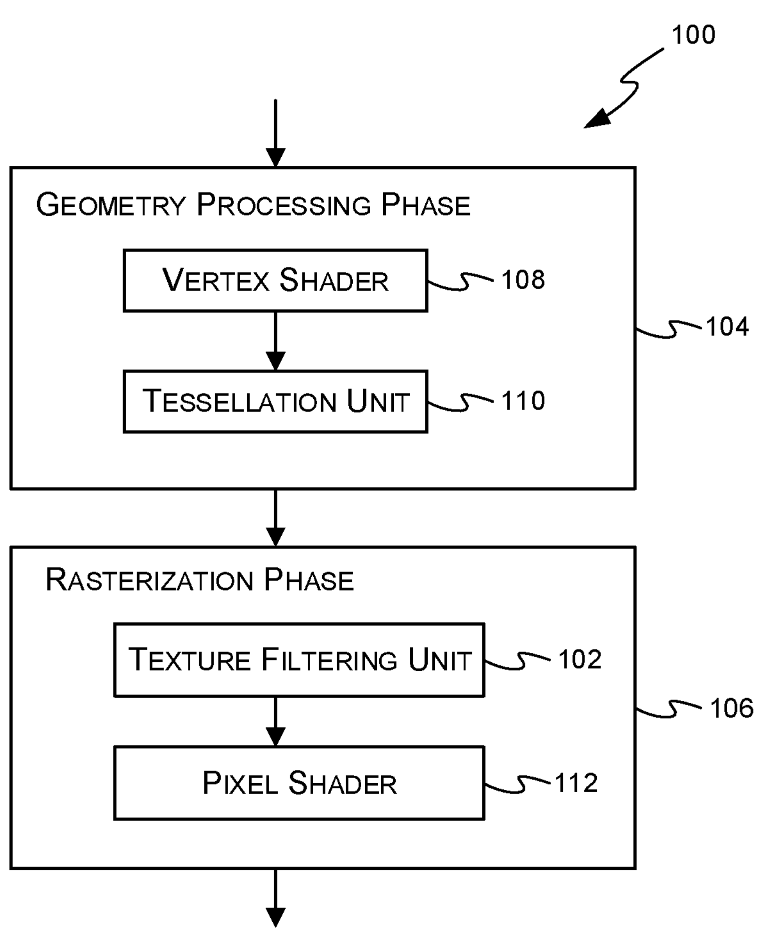
FIG. 1 is a schematic diagram of an example graphics processing unit (GPU) pipeline.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Texture filtering is implemented in dedicated hardware within a GPU and as described above it is a computationally expensive operation and so this hardware can be quite large. The texture values (where each value usually corresponds to a texel centre) may be stored in any number format, but frequently these are floating-point values (e.g. half-precision binary floating-point format which may be referred to as F16) and in current hardware, the floating-point modules used to perform the filtering include intermediate rounding steps which means that the final output (i.e. the filtered value) is not fully accurate and this can result in visual artefacts in the rendered scene.

Described herein is a texture filtering unit that may be implemented within a GPU that includes only a single multiplication stage per input texture value. In order to implement this, hardware logic within the texture filtering unit generates a single, composite, filter coefficient per input texture value. The texture filtering unit described herein converts the input texture values from floating-point form (e.g. F16 form) to a type of fixed-point representation (e.g. comprising a fixed-point significand and an exponent) so that they are accurately representable at all stages of the filtering and there are no intermediate rounding steps. The output filtered value is therefore fully accurate. As well as providing a fully accurate output value, the hardware described herein additionally provides high throughput (e.g. two texture values per clock cycle), requires very little control logic and can be implemented hardware which is of a similar size to current, less accurate, hardware and may additionally have reduced power consumption (e.g. in implementations where the hardware area of the texture filtering unit described herein is smaller than current hardware).

FIG. 1 shows a schematic diagram of an example graphics processing unit (GPU) pipeline 100 which may be implemented in hardware within a GPU and which comprises a texture filtering unit 102. As shown in FIG. 1, the pipeline 100 comprises a geometry processing phase 104 and a rasterization phase 106. Data generated by the geometry processing phase 104 may pass directly to the rasterization phase 106 and/or some of the data may be written to memory (e.g. parameter memory, not shown in FIG. 1) by the geometry processing phase 104 and then read from memory by the rasterization phase 106.

The geometry processing phase 104 comprises a vertex shader 108 and tessellation unit 110. It may, in various examples, also comprise a tiling unit (not shown in FIG. 1). Between the vertex shader 108 and the tessellation unit (or tessellator) 110 there may be one or more optional hull shaders (not shown in FIG. 1). The geometry processing phase 104 may also comprise other elements not shown in FIG. 1, such as a memory and/or other elements.

The vertex shader 108 is responsible for performing per-vertex calculations. Unlike the vertex shader, the hardware tessellation unit 110 (and any optional hull shaders) operates per-patch and not per-vertex. The tessellation unit 110 outputs primitives.

The rasterization phase 106 renders some or all of the primitives generated by the geometry processing phase 104. The rasterization phase 106 comprises the texture filtering unit 102, a pixel shader 112 and may comprise other elements not shown in FIG. 1. The structure and operation of the texture filtering unit 102 is described in detail below.

Figure 2:
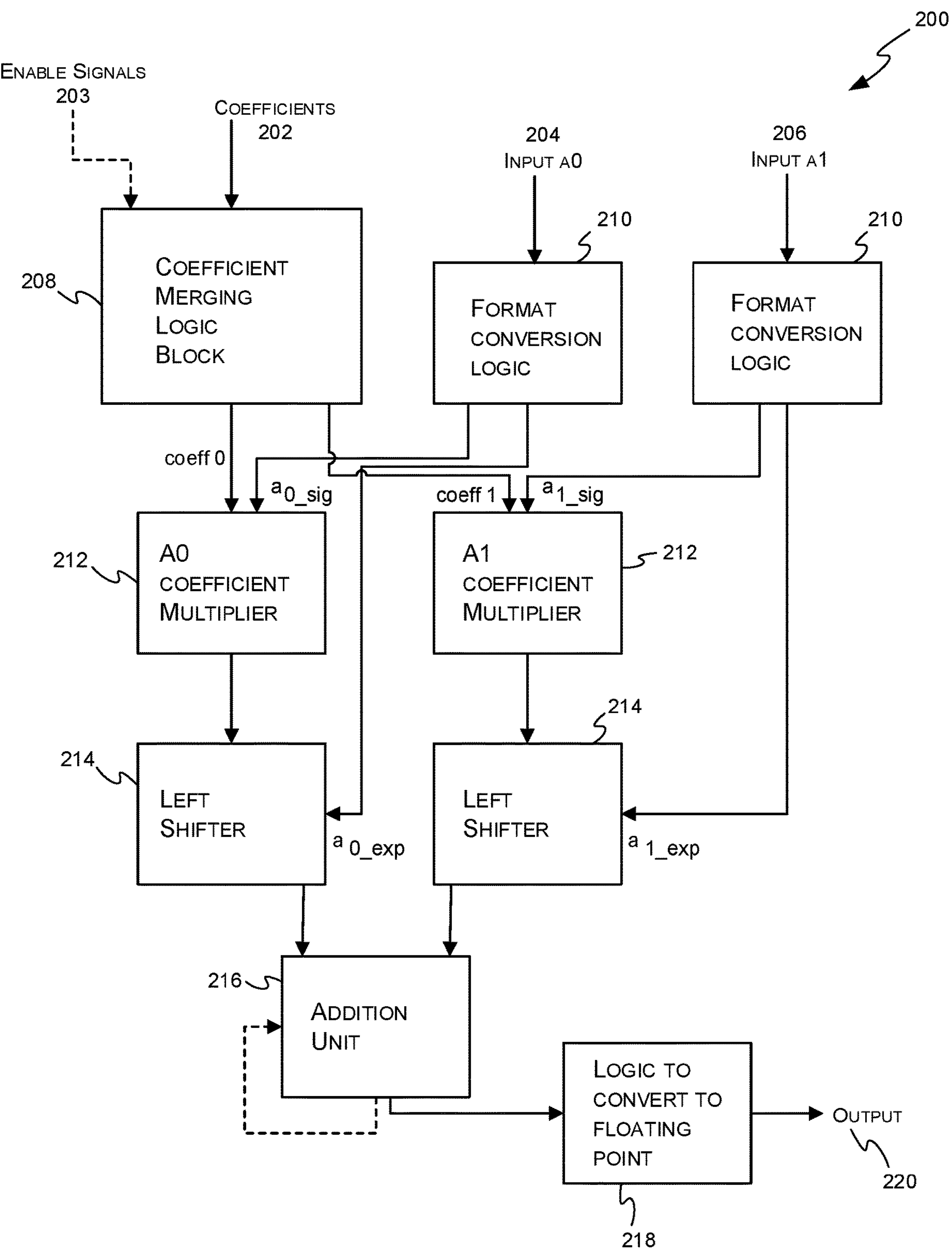
FIG. 2 is a schematic diagram of a first example texture filtering unit.

FIG. 2 is a schematic diagram of a first example texture filtering unit 200 which may be implemented as the texture filtering unit 102 in the pipeline 100 of FIG. 1. As shown in FIG. 2, the texture filtering unit 200 comprises several inputs, including a plurality of filter coefficients 202 and two texture value inputs: inputa0 204 and inputa1 206. In this example, the texture filtering unit 200 can receive two texture values each clock cycle (one via inputa0 and the other via inputa1); however, in other examples, a texture filtering unit may be configured to receive more than two texture values in a single clock cycle and may have additional inputs for this purpose (not shown in FIG. 2). As described above, the texture values that are received are in floating-point format (e.g. F16).

The texture filtering unit 200 further comprises a coefficient merging block 208, format conversion logic 210 arranged to convert each of the input texture values from floating-point format to a type of fixed-point representation comprising a fixed-point significand and an exponent, two multipliers 212 (or more generally, one multiplier per texture value input, such that where there are more than two inputs, there are more than two multipliers), logic 214 arranged to shift (e.g. left shift) the output of each multiplier (e.g. by the exponent values so that inputs are correctly aligned relative to each other before entering the addition unit), an addition unit 216 and logic 218 arranged to convert an output from the addition unit back to floating-point format, before being output, via output 220.

In various examples the texture filtering unit 200 is arranged to perform any weighted sum of a set of floating-point texture value inputs and in the examples described herein this is described as being used to perform any combination of volumetric, anisotropic and trilinear filtering; however, in other examples, the texture filtering unit 200 is arranged to perform any combination of a different set of two or more filtering methods or any other operation that is implemented as a weighted sum of a set of floating-point texture value inputs. The coefficients 202 that are input to the texture filtering unit 200 (and in particular to the coefficient merging logic block 208) therefore comprise at least one coefficient for each filtering method that the texture filtering unit 200 can implement, e.g. vfrac, afrac and tfrac, where vfrac is the coefficient for volumetric filtering, afrac is the coefficient for anisotropic filtering and tfrac is the coefficient for trilinear filtering, and/or 2n-vfrac and 2 m-tfrac, where n and m are the bit-widths of vfrac and tfrac respectively, and/or additional coefficients for any of the filtering methods. In various examples, the values of the coefficients may change every clock cycle or may change less frequently or may be constant (e.g. vfrac may change each clock cycle, afrac may change less often and tfrac may be constant). In various examples, these coefficients may be unsigned fixed-point values with no integer bits and either 8 or 16 fractional bits (e.g. U0.8 or U0.16); however, any coefficient sizes (e.g. in terms of number of bits) may be used. In scenarios where only a proper subset of the filtering methods are used, the coefficients of those methods not being used may be set to a default value (e.g. where anisotropic filtering is not used the coefficient, afrac, may be set to one) or separate enable signals 203 may additionally be provided.

In examples where enable signals 203 are provided these may have a value that specifies whether each filtering method (or mode) is enabled and any necessary parameters for the filtering method. For example, three enable signals may be provided as detailed below:

| Enable signal | Possible values | Meaning |
|---|---|---|
| vol_en | 0, 1 | Volumetric filtering is disabled or enabled respectively |
| tri_en | 0, 1 | Trilinear filtering is disabled or enabled respectively |
| ani_rt | 0, 1, 3, 5, 7, 9, 11, 13, 15 | Anisotropic filtering is disabled (ani_rt = 0) or enabled (ani_rt > 0), where the number of texture values combined is given by one more than the value of the enable signal (i.e. ani_rt + 1). |

The texture filtering unit 200 is arranged to perform filtering using any combination of one or more of a set of filtering methods and the coefficient merging logic block 208 comprises hardware logic arranged to combine coefficients for each of the filtering methods together to generate (and then output) a single composite filter coefficient for each input texture value. In the example shown in FIG. 2 in which two texture values are received each clock cycle, the coefficient merging logic block 208 outputs two coefficients each clock cycle, coeff_0 and coeff_1, and these are input to the a0 coefficient multiplier and a1 coefficient multiplier 212 respectively. In various examples, these merged coefficients are unsigned fixed-point numbers having zero or one integer bit and 32 fractional bits. In various examples, the coefficient merging logic block 208 may comprise a plurality of multiplexers, logical negation elements (e.g. XORs) and adders and only two multipliers (as described in detail below). In other examples, more than two multipliers may be provided within the coefficient merging logic block 208. As described above, the texture values that are received via the inputs 204, 206 are in floating-point format (e.g. F16) and these are input into the format conversion logic 210 that is arranged to convert each of the input texture values from floating-point format to a type of fixed-point representation, i.e. by generating, from the input texture values, a fixed-point significand and an exponent. The input texture values comprise a sign bit s, an exponent e and a mantissa m. The exponent e comprises E exponent bits (where for F16, E=5) and the mantissa m comprises M mantissa (or fraction) bits (where for F16, M=10). Each of these logic elements 210 converts an input texture value to a fixed-point representation by splitting the input texture value into two outputs:

$$a_{i\_sig} = (-1)^s(1 \cdot m)$$

$$a_{i\_exp} = 2^{e-15}$$

where i=[0,1] and for the first input texture value i=0 and for the second input texture value i=1. The first output from each of the logic elements 210, one for each of the input texture values (i.e. $a_{0\_sig}$ and $a_{1\_sig}$), are input to the a0 coefficient and a1 coefficient multipliers 212 respectively. These first outputs are, for F16 inputs, signed fixed-point numbers having two integer bits and 10 fractional bits. The second output from each of the logic elements 210, one for each of the input texture values (i.e. $a_{0\_exp}$ and $a_{1\_exp}$) are input to the first and second left shifters 214 respectively.

Each of the multipliers 212 receives one input from the conversion logic 210 (comprising a part of the input texture value in fixed-point representation) and one input from the coefficient merging logic block 208 (comprising the composite filter coefficient for the particular input texture value). Each multiplier 212 multiplies its two inputs together to generate an output value $add_i$:

$$add_i = a_{i\_sig} * coeff\_i$$

where i=[0,1] and for the first input texture value (and hence first multiplier) i=0 and for the second input texture value (and hence second multiplier) i=1.

The outputs from the multipliers 212, which for F16 inputs are signed fixed-point numbers having two integer bits and 42 fractional bits, are shifted, in the respective shifting logic 214, by the value $a_{i\_exp}$, before the two outputs from the shifting logic elements 214 are added together in the addition unit 216. For F16 inputs, the result of the addition in the addition unit may be of the order of 77 bits in width.

As described above, a single composite coefficient is generated for each input texture value in the coefficient merging logic block 208 and so each multiplication operation performed by either of the two multipliers 212 involves a new texture value and a newly generated composite coefficient for that texture value, although in some cases, two or more of the composite coefficients, whilst separately generated, may have the same value.

If the texture filtering operation only involves the two texture values input on the same clock cycle, then the result of the addition operation in the addition unit 216 is the final result that is output (via output 220) once it has been converted back to floating-point format in the conversion logic block 218; however, unless only volumetric filtering or only trilinear filtering is enabled (e.g. by the enable signals 203 or by setting the coefficients for the other filtering methods to their default value, e.g. 1), more than two texture values will be involved in generating the output result, as described below. In all cases, however, the final result generated by the addition unit 216 is fully accurate and there is only a single rounding operation that is implemented when the final result is converted back from fixed-point format to floating-point format in the conversion logic 218.

In examples where the texture filtering operation involves more than two texture values, these are input over a plurality of clock cycles, e.g. N clock cycles. For example, the filtering operation may use up to 64 texture values input over up to 32 clock cycles (assuming that there is no stalling). In examples that use more than two texture values to generate an output result (e.g. where N>1), the addition unit 216 may be a fixed-point 3 adder (i.e. it is configured to add together three fixed-point inputs) that adds together the result from the previous clock cycle (which may be referred to as an intermediate result and may be stored in registers) and the two newly received inputs. In such examples, it is the result of the Nth addition operation that is output as the final result (via output 220) after it has been converted back to floating-point format in the conversion logic block 218.

The size of the 3 adder is determined at design time dependent upon the size of the coefficient and texture inputs and the accuracy required of the resulting hardware. Wider 3 adders (in terms of bit-width) are physically larger (e.g. in terms of area) and slower and as a result the time taken for a wide 3 adder to perform the addition may exceed the time available in a single clock cycle. Consequently, in various examples, the addition unit 216 may comprise a 3:2 compressor followed by a carry-save adder instead of a 3 adder.

The number of texture values that are involved in any filtering operation may, for example, be determined based on the values of the enable signals 203, as follows:

$$\text{Number of texture values} = (\text{vol\_en}+1)*(\text{ani\_rt}+1)*(\text{tri\_en}+1)$$

For example, if all three filtering methods are used, such that vol_en=tri_en=1 and ani_rt={1, 3, . . . , 15}, then the total number of texture values that are involved is between 8 and 64.

For example, if 2N texture values are involved, the additions performed by the addition unit 216 are as follows:

$$result_1 = add_{0\_1} = add_{1\_1}$$
$$result_2 = result_1 + add_{0\_2} + add_{1\_2}$$
$$result_3 = result_2 + add_{0\_3} + add_{1\_3}$$
$$\ldots$$
$$result_N = result_{N-1} + add_{0\_N} + add_{1\_N}$$

Where $add_{i\_t}$ is the output from the ith multiplier that is input to the addition unit 216 for use in the tth addition operation (i.e. to generate $result_t$). In this example, $result_1$-$result_{N-1}$ are intermediate results and $result_N$ is the final result.

In examples described above where more than two texture values are used in the texture filtering operation (and hence N>1), it has been assumed that all the texture values used in the texture filtering operation are input on consecutive clock cycles. In such examples, the fixed-point 3 adder adds the two newly received inputs to the result of the immediately previous addition operation (in addition unit 216). In other examples, however, a plurality of input streams of texture values may be interleaved such that the fixed-point 3 adder adds the two newly received inputs to the result of the immediately previous addition operation for that input stream, which may not necessarily be the immediately previous addition operation performed by the addition unit. This interleaving operation may be enabled using an additional enable signal 203:

| Enable signal | Possible values | Meaning |
|---|---|---|
| interleaving | 0, 1 | Interleaving is disabled or enabled respectively |

For example, if two input streams of texture values are interleaved, stream A and stream B, and each filtering operation involves 2N texture values, the additions performed by the addition unit 216 are as follows:

$$result_{1A} = add_{0\_1A} = add_{1\_1A}$$
$$result_{1B} = add_{0\_1B} = add_{1\_1B}$$
$$result_{2A} = result_{1A} + add_{0\_2A} + add_{1\_2A}$$
$$result_{2B} = result_{1B} + add_{0\_2B} + add_{1\_2B}$$
$$result_{3A} = result_{2A} + add_{0\_3A} + add_{1\_3A}$$
$$result_{3B} = result_{2B} + add_{0\_3B} + add_{1\_3B}$$
$$\ldots$$
$$result_{NA} = result_{(N-1)A} + add_{0\_NA} + add_{1\_NA}$$
$$result_{NB} = result_{(N-1)B} + add_{0\_NB} + add_{1\_NB}$$

Where $add_{i\_tA}$ is the output from the ith multiplier that is input to the addition unit 216 for use in the tth addition operation for stream A (i.e. to generate $result_{tA}$) and $add_{i\_tB}$ is the output from the ith multiplier that is input to the addition unit 216 for use in the tth addition operation for stream B (i.e. to generate $result_{tB}$). In this example, $result_{1A}$–$result_{(N-1)A}$ and $result_{1B}$–$result_{(N-1)B}$ are intermediate results and $result_{NA}$ and $result_{NB}$ are the final results.

The interleaving of input streams of texture values may be used where, for example, a plurality of texture values are accessed from memory at the same time (e.g. R and G values), for example because they are stored contiguously, but need to be filtered separately (e.g. where colour filtering is being performed separately for each colour). This improves efficiency (e.g. in terms of speed and power because it avoids having to store one stream of texture values, e.g. the G values, in a separate register until all the other stream of texture values, e.g. the R values, have been filtered).

Whilst the example above shows the interleaving of two input streams, in further examples, additional control logic and registers may be provided to enable the filtering unit to interleave more than two input streams (e.g. 3 or 4 inputs streams).

Figure 3:
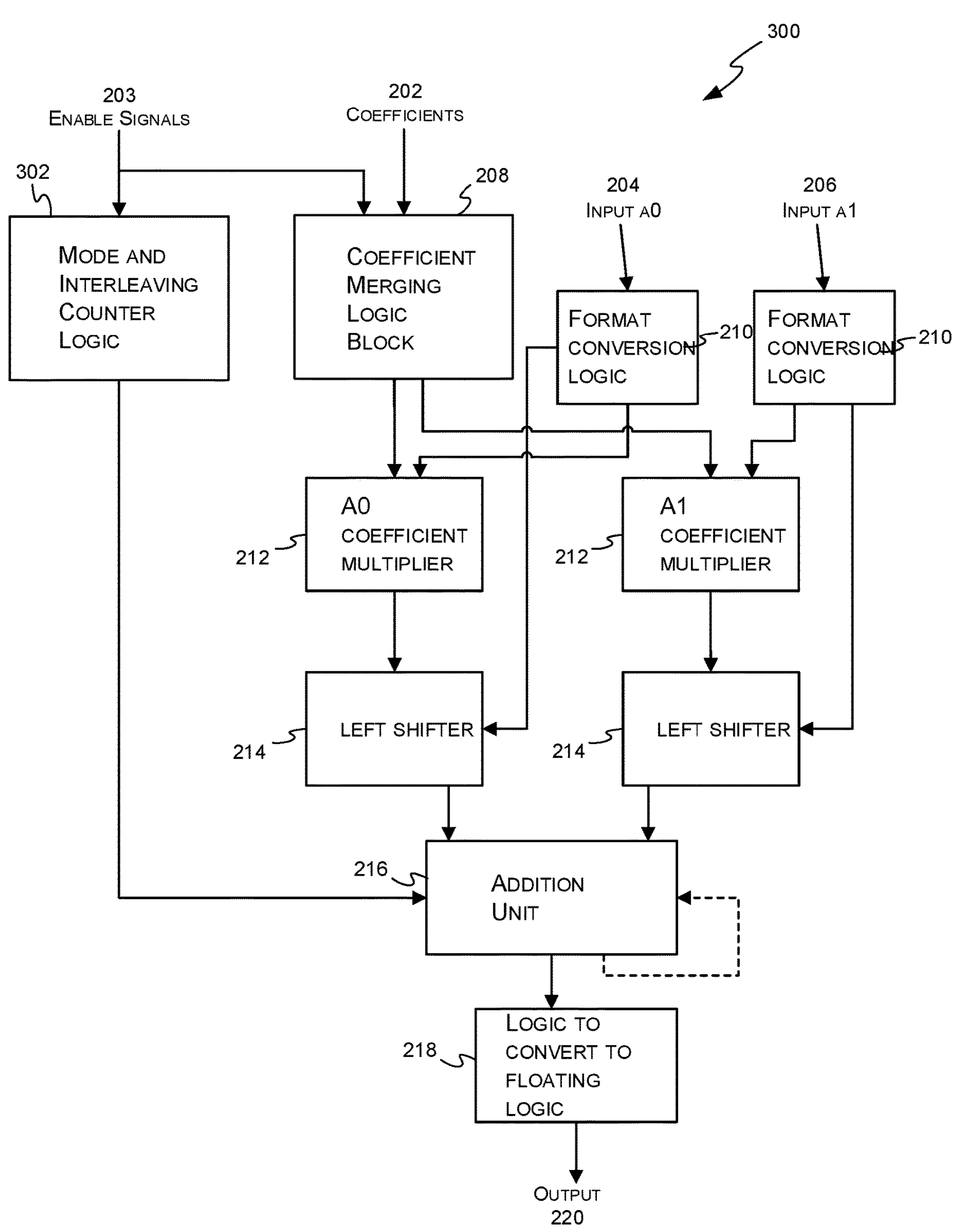
FIG. 3 is a schematic diagram of a second example texture filtering unit.

FIG. 3 is a schematic diagram of a second example texture filtering unit 300 which may be implemented as the texture filtering unit 102 in the pipeline 100 of FIG. 1. This texture filtering unit 300 is the same as that shown in FIG. 2 and described above with the addition of a mode and interleaving counter logic element 302. As shown in FIG. 3, this mode and interleaving counter logic element 302 receives the enable signals 203, where, as described above, these enable signals may include values that specify whether each filtering method (or mode) is enabled or not and any necessary parameters for the filtering method. In examples where more than two texture values are used in the texture filtering operation (and hence N>1), the mode and interleaving counter logic element 302 controls, by way of an input to the addition unit 302, which addition results are output by the addition unit 216, converted back to floating-point by the conversion logic 218 and output (via output 220), and which addition results are only intermediate results that require further accumulation to generate a final result. The control logic may comprise a counter that counts down from N or up to N and on reaching 0 or N respectively, triggers the output of a final result by the addition unit 216. In addition, or instead, the mode and interleaving counter logic element 302 controls, by way of an input to the addition unit 302, any interleaving operation of the addition unit 216 (as described above). For example, dependent upon the value of an interleaving control signal input to the addition unit 216 from the mode and interleaving counter logic element 302, the two new inputs to the addition unit 216 may be added to a different one of a plurality of stored intermediate results (e.g. one for each input stream).

Figure 4:
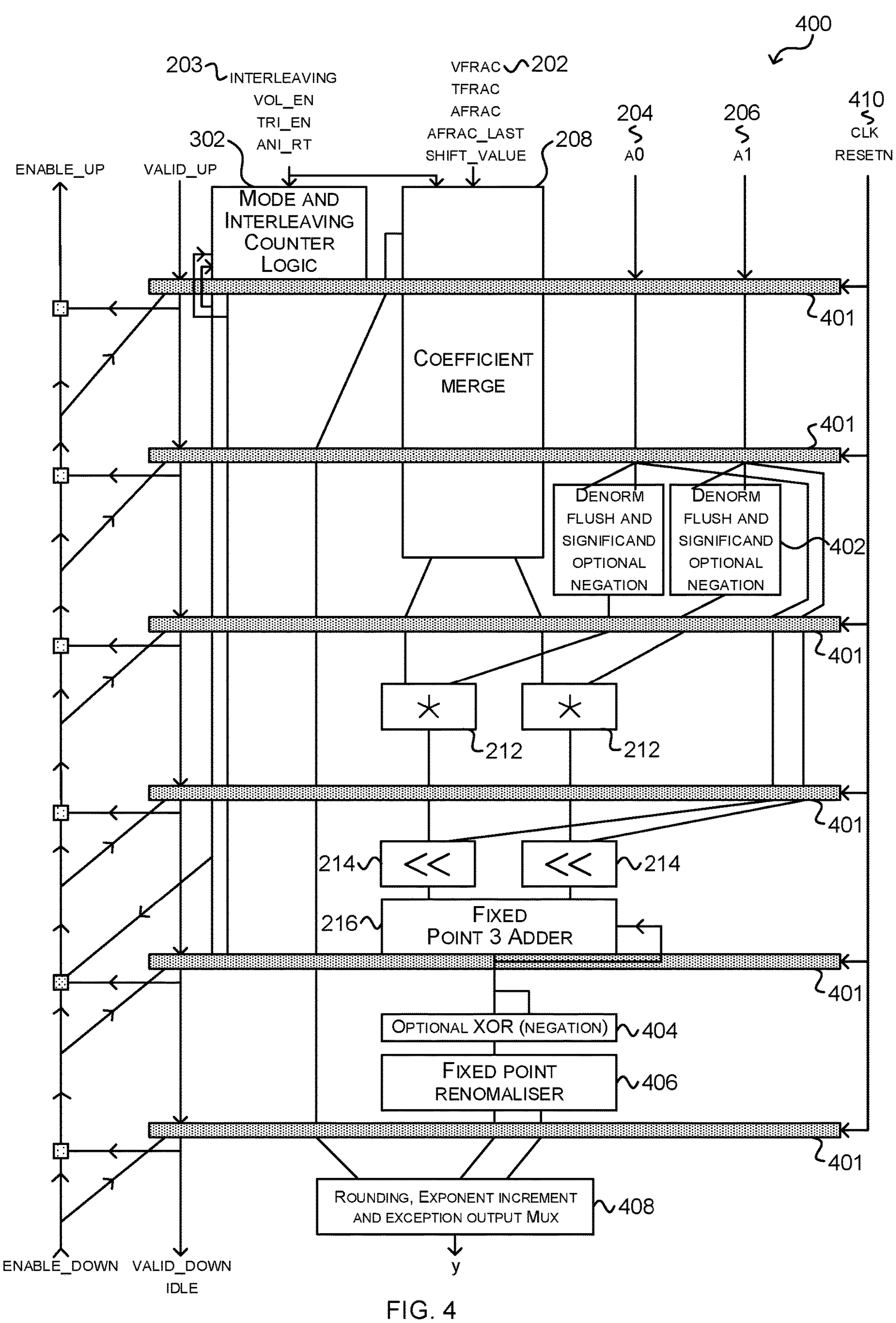
FIG. 4 is a schematic diagram of a third example texture filtering unit.

FIG. 4 is a schematic diagram of a third example texture filtering unit 400 which may be implemented as the texture filtering unit 102 in the pipeline 100 of FIG. 1. This is a variation on the texture filtering unit 300 shown in FIG. 3 and described above. This diagram shows the register stages 401 within the texture filtering unit 400 and logic between two register stages operates in a single clock cycle. The clock input 410 controls the timing of the operation of the logic and when data is read into and out of the register stages 401. The denorm flush and significand optional negation blocks 402 perform at least a part of the conversion of the input texture values from floating-point to fixed-point format (equivalent to block 210 in FIGS. 2 and 3). The optional XOR (negation) logic block 404 shown in FIG. 4 is used if the output from the addition unit 216 is negative. In such instances, the output is negated and the sign bit is changed. The combination of the fixed-point normaliser logic block 406 and the rounding, exponent increment and exception output multiplexer 408 perform the conversion of the output back into floating-point format (equivalent to block 218 in FIGS. 2 and 3). FIG. 4 also shows a number of other signals such as flags (e.g. valid_up which indicates whether the inputs a0 and a1 contain valid data or not and valid_down which indicates whether a sequence that takes more than one clock signal to execute has completed and hence whether output y is a result of a texture filtering sequence) and enable signals (e.g. enable_down that indicates whether the next component in the sequence has sufficient register space to accept the next valid output or whether the previous register stage must stall).

Figure 5:
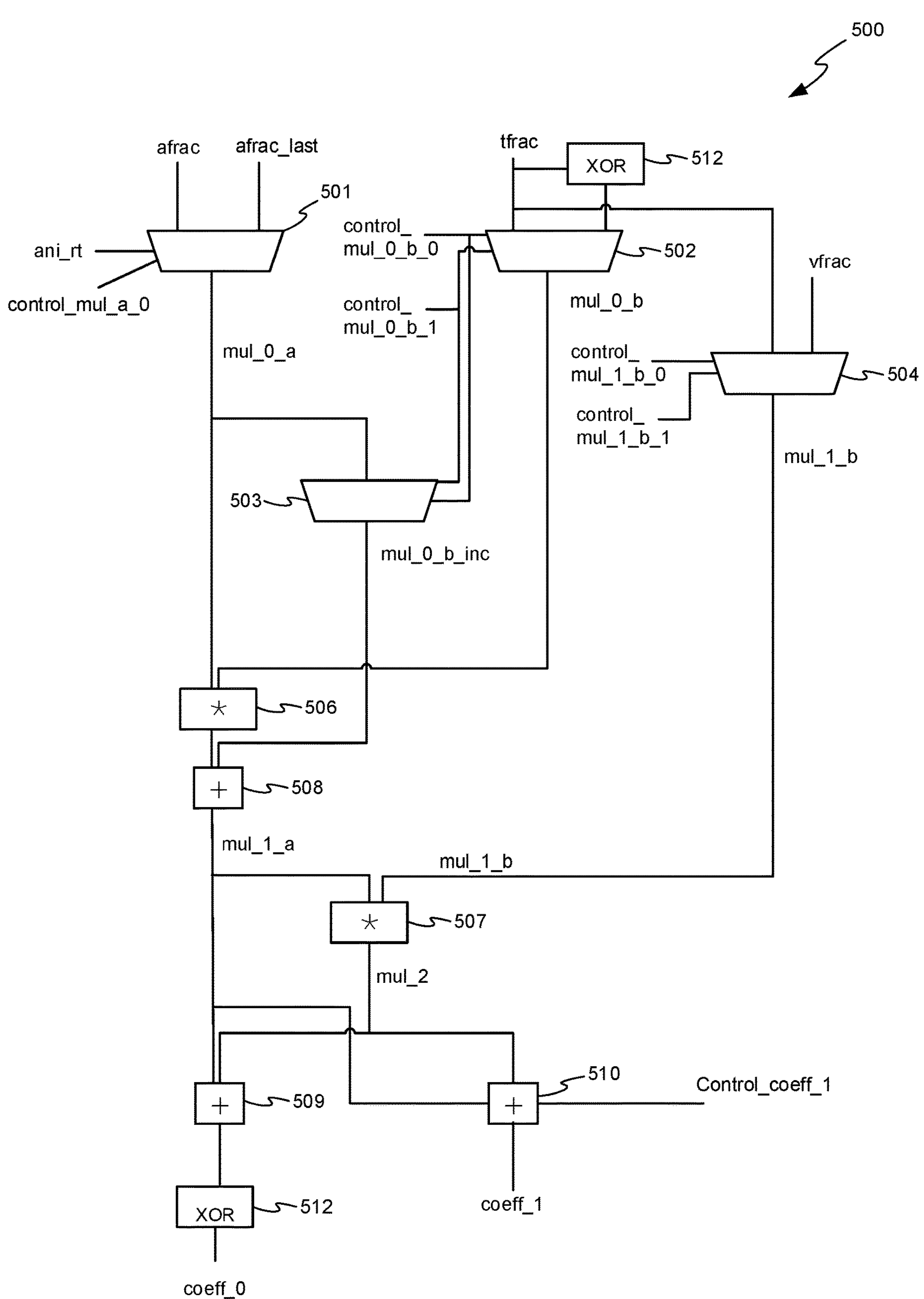
FIG. 5 is a schematic diagram of an example coefficient merging logic block.

FIG. 5 is a schematic diagram of an example coefficient merging logic block 500 in more detail. This coefficient merging logic block 500 may be implemented as the coefficient merging logic block 208 in any of FIGS. 2-4. As shown in FIG. 5, the coefficient merging logic block 500 comprises 4 multiplexers 501-504 and two multipliers 506-507. There are also a number of addition elements 508-510 and logical negation units (e.g. XORs) 512. The coefficient merging logic block 500 receives as inputs, three coefficients: vfrac, tfrac and afrac (as described above) and various control signals: ani_rt (as described above), control_mul_a_0, control_mul_0_b_0, control_mul_0_b_1, control_mul_1_b_0, control_mul_1_b_1, control_coeff_1, where these control signals may, for example be derived from the enable signals described above, such that the coefficients are merged correctly to combine the different filtering modes as required by the mode enable signals. The coefficient merging logic block 500 generates two outputs, coeff_0 and coeff_1 (as described above).

The first multiplexer 501 receives two inputs, afrac and afrac last (which may, for example, be a second anisotropic filtering coefficient) and two control signals ani_rt and control_mul_a_0 and generates an output mul_0_a as follows:

$$\text{mul\_0\_a} = \begin{cases} 1 & \text{when ani\_rt} = 0 \quad \text{else} \\ \text{afrac\_last} & \text{when control\_mul\_a\_0} = 1 \quad \text{else} \\ afrac & \text{otherwise} \end{cases}$$

The second multiplexer 502 receives one input, tfrac, and two control signals control_mul_0_b_0 and control_mul_0_b_1 and generates an output mul_0_b_b as follows:

$$\text{mul\_0\_b} = \begin{cases} 1 & \text{when control\_mul\_0\_b\_0} = 1 \quad \text{else} \\ tfrac & \text{when control\_mul\_0\_b\_1} = 1 \quad \text{else} \\ \overline{tfrac} & \text{otherwise} \end{cases}$$

Where $\overline{\text{tfrac}}$ is the logical negation of bits in tfrac (e.g. such that 01101101 goes to 10010010).

The third multiplexer 503 receives one input, mul_0_a, which is the output from the first multiplexer 501, and two control signals control_mul_0_b_0 and control_mul_0_b_1 and generates an output mul_0_b_inc as follows:

$$\text{mul\_0\_b\_inc} = \begin{cases} 0 & \text{when control\_mul\_0\_b\_0} = 1 \quad \text{else} \\ 0 & \text{when control\_mul\_0\_b\_1} = 1 \quad \text{else} \\ 2^{-8} * \text{mul\_0\_a} & \text{otherwise} \end{cases}$$

The signal mul_0_b_inc is effectively an increment bit with the same selection logic as mul_0_b which effectively changes the $\overline{\text{tfrac}}$ value to 1−tfrac in the multiplication without the need for a subtraction. The fourth multiplexer 504 receives two inputs, tfrac and vfrac, and two control signals control_mul_1_b_0 and control_mul_1_b_1 and generates an output mul_1_b as follows:

$$\text{mul\_1\_b} = \begin{cases} tfrac & \text{when control\_mul\_1\_b\_0} = 1 \quad \text{else} \\ 0 & \text{when control\_mul\_1\_b\_1} = 1 \quad \text{else} \\ vfrac & \text{otherwise} \end{cases}$$

The first multiplier 506 receives two inputs, mul_0_a (as output by the first multiplexer 501) and mul_0_b (as output by the second multiplexer 502) and multiplies the two inputs together. The result is then added (in addition element 508) to the output from the third multiplexer 503 such that:

$$\text{mul\_1\_a} = \text{mul\_0\_a} * \text{mul\_0\_b} + \text{mul\_0\_b\_inc}$$

The second multiplier 507 receives two inputs, mul_1_a (as output by the first multiplier 506) and mul_1_b (as output by the fourth multiplexer 504) and multipliers the two inputs together such that:

$$\text{mul\_2} = \text{mul\_1\_a} * \text{mul\_1\_b}$$

The two output coefficients, coeff_0 and coeff_1, are then generated using two further addition elements 509, 510. The first of these addition units 509 receives two inputs, mul_1_a (as output by another addition unit 508) and mul_2 (as output by the second multiplier 507) and generates coeff_0 as follows:

$$\text{coeff\_0} = \overline{(\text{mul\_2} - 2^{-32} - \text{mul\_1\_a})}$$

The second of these addition units 510 receives the same two inputs and a control signal control_coeff_1 (which may be generated as control_coeff_1=not(vol_en) AND ani_rt [0]) and generates coeff_1 as follows:

$$\text{coeff\_1} = (\text{mul\_2} + (\text{control\_coeff\_1} \, ? \, \text{mul\_1\_a} : 0)$$

In other examples, the coefficient merging logic block 500 shown in FIG. 5 may be modified by implementing any one or more of the following:

- a multiplexer may be saved by replacing $\overline{\text{tfrac}}$ with 1−tfrac in the fourth multiplexer 504;
- any logical negation (i.e. the XOR blocks) may be swapped for an arithmetic negation; replacing the XOR blocks 512 by NOT blocks;
- combining the filter mode coefficients (e.g. afrac and tfrac) in a different order.

As shown in FIG. 5, only two multiplications (and hence two multipliers 506, 507) are used to produce both coefficients and this provides an efficient hardware implementation (e.g. in terms of size and/or power).

In the examples described above there is no rounding of the composite filter coefficients generated by the coefficient merging logic block. To reduce the area of the texture filtering unit at a cost of reduced accuracy, the composite filter coefficients may undergo a rounding operation to reduce their bit width.

Whilst all the examples described herein show two texture values being input per clock cycle, the texture filtering unit described herein may be extended by the inclusion of additional texture value inputs and corresponding conversion logic 210, multipliers 212 and left shifters 214 to enable more than two values to be input (and subsequently processed) per clock cycle.

In a further variation, the texture filtering unit may incorporate a bilinear filtering stage. In such an example, the two texture values may be input to the bilinear filtering stage and the two values output from that stage may be output to the two multipliers. Alternatively, the coefficient merging block may be modified to include bilinear filtering coefficients. Whilst the examples above refer to input texture values which are F16 format, i.e. such that E=5 and M=10, the hardware and methods described above may also be used for texture values in different formats, e.g. F32 or full-precision floating-point format (where E=8 and M=23). By using F32 inputs, the output from the multipliers are significantly wider (e.g. 279 bit signed numbers) and the output from the addition unit 216 may be of the order of 300 bits in width.

In variations on the examples described herein, by reducing internal bit-widths at any stage, the accuracy can be traded off against area/delay.

The techniques described above in the context of texture filtering within a GPU may also be used for other applications that involve floating-point operations comprising evaluation of a plurality of sum-of-products (SOPs) followed by an accumulation stage (e.g. any weighted sum of floating point input values). In such examples, the texture filtering unit described above may instead be referred to as a computation unit and the filter coefficients may instead be replaced by SOP coefficients.

A further example describes a graphics processing unit comprising a computation unit implemented in hardware logic, the computation unit comprising: a plurality of inputs arranged to receive at least two input values each clock cycle and a plurality of SOP coefficients, the plurality of SOP coefficients comprising coefficients relating to a plurality of different SOPs; hardware logic arranged to convert the input values from floating-point format to fixed-point format; a coefficient merging logic block arranged to generate a single composite coefficient for each input value from the plurality of SOP coefficients; one multiplier for each input value, wherein each multiplier is arranged to multiply one of the input values by its corresponding single composite coefficient; an addition unit arranged to add together outputs from each of the multipliers; hardware logic arranged to convert an output from the addition unit from fixed-point format to floating-point format; and an output arranged to output the converted output from the addition unit.

Figure 6:
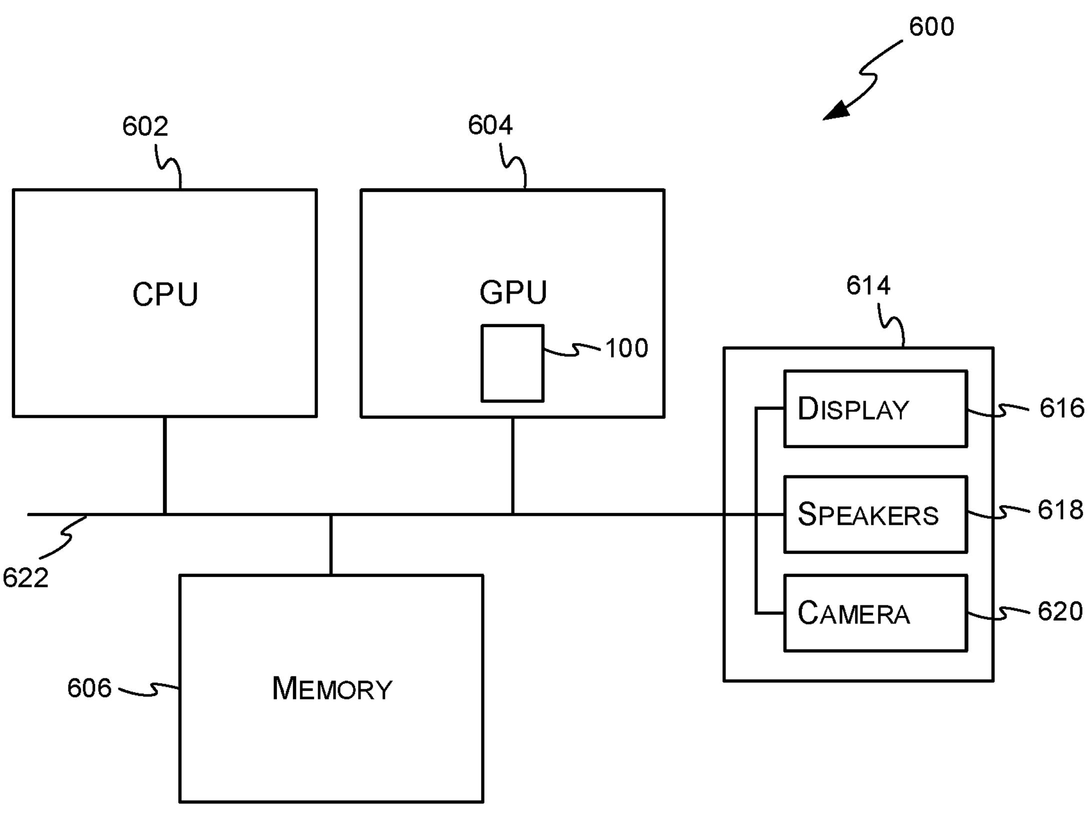
FIG. 6 shows a computer system in which a texture filtering unit as described herein is implemented.

FIG. 6 shows a computer system in which the graphics processing systems described herein may be implemented. The computer system comprises a CPU 602, a GPU 604, a memory 606 and other devices 614, such as a display 616, speakers 618 and a camera 620. A GPU pipeline 100 comprising a texture filtering unit as described above is implemented within the GPU 604. The components of the computer system can communicate with each other via a communications bus 622.

FIGS. 1-5 are shown as comprising a number of functional blocks. This is schematic only and is not intended to define a strict division between different logic elements of such entities. Each functional block may be provided in any suitable manner. It is to be understood that intermediate values described herein as being formed by the texture filtering unit (or more the coefficient merging logic block within the texture filtering unit) need not be physically generated by the hardware logic at any point and may merely represent logical values which conveniently describe the processing performed by the texture filtering unit between its input and output.

The texture filtering unit described herein may be embodied in hardware on an integrated circuit. The texture filtering unit described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a texture filtering unit configured to perform any of the methods described herein, or to manufacture a texture filtering unit comprising any apparatus described herein. An integrated circuit definition dataset may be, for example, an integrated circuit description.

Therefore, there may be provided a method of manufacturing, at an integrated circuit manufacturing system, a texture filtering unit as described herein. Furthermore, there may be provided an integrated circuit definition dataset that, when processed in an integrated circuit manufacturing system, causes the method of manufacturing a texture filtering unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a texture filtering unit will now be described with respect to FIG. 7.

Figure 7:
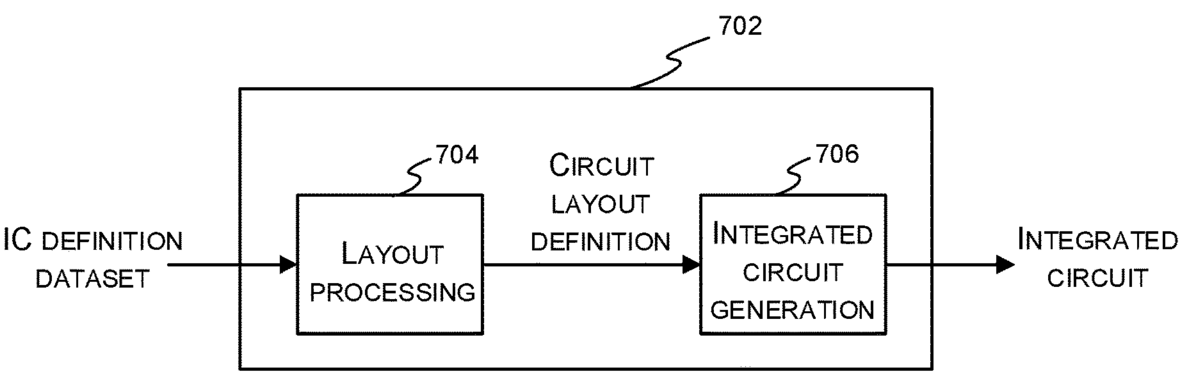
FIG. 7 shows an integrated circuit manufacturing system for generating an integrated circuit embodying a texture filtering unit as described herein.

FIG. 7 shows an example of an integrated circuit (IC) manufacturing system 702 which is configured to manufacture a texture filtering unit (or a GPU comprising a texture filtering unit, as described herein) as described in any of the examples herein. In particular, the IC manufacturing system 702 comprises a layout processing system 704 and an integrated circuit generation system 706. The IC manufacturing system 702 is configured to receive an IC definition dataset (e.g. defining a texture filtering unit as described in any of the examples herein), process the IC definition dataset, and generate an IC according to the IC definition dataset (e.g. which embodies a texture filtering unit as described in any of the examples herein). The processing of the IC definition dataset configures the IC manufacturing system 702 to manufacture an integrated circuit embodying a texture filtering unit as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system

1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a texture filtering unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function (s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A texture filtering unit implemented in hardware logic, wherein the texture filtering unit is configured to perform a filtering operation involving texture values input over N clock cycles for each of a plurality of streams of texture values, where N>1, the texture filtering unit comprising:

- a plurality of inputs arranged to receive at least two texture values each clock cycle and a plurality of filter coefficients, the plurality of filter coefficients comprising coefficients relating to a combination of at least two of volumetric, anisotropic and trilinear texture filtering methods;
- format conversion logic arranged to convert the input texture values from floating-point format to a fixed-point significand and an exponent;
- a coefficient merging logic block arranged to generate a single composite filter coefficient for each input texture value from the plurality of filter coefficients comprising coefficients relating to a combination of at least two of volumetric, anisotropic and trilinear texture filtering methods, wherein the single composite filter coefficient is calculated independent of the input texture value;
- one multiplier for each input texture value, wherein each multiplier is arranged to multiply the significand of one of the input texture values by its corresponding single composite filter coefficient;
- an addition unit arranged, for each of the streams of texture values:
  - in a first clock cycle of the N clock cycles for the stream of texture values, to add together outputs from each of the multipliers;
  - in each of a second clock cycle to a Nth clock cycle of the N clock cycles for the stream of texture values, to add together outputs from each of the multipliers and a result of the addition from an immediately previous one of the N clock cycles for the stream of texture values; and
  - to output a result of the addition in the Nth clock cycle of the N clock cycles for the stream of texture values;
- a mode and an interleaving counter logic block arranged to control operation of the addition unit such that in adjacent clock cycles, texture values are input from different streams of texture values to interleave the plurality of streams of texture values;
- hardware logic arranged to convert an output from the addition unit from fixed-point format to floating-point format; and
- an output arranged to output the converted output from the addition unit.

2. The texture filtering unit according to claim 1, wherein each input texture value comprises a sign bit, a plurality of exponent bits and a plurality of mantissa bits, the texture filtering unit further comprising a left shifting logic block for each input texture value,

- and wherein the format conversion logic is configured to divide each input texture value into a fixed-point significand and an exponent, wherein the fixed-point significand of each input texture value is input to the corresponding multiplier and the second portion exponent of each input texture value is input to the corresponding left shifting logic block,
- wherein the fixed-point significand of each input texture value comprises the sign bit and mantissa bits and the exponent of each input texture value comprises the exponent bits,
- and wherein each left shifting logic block is arranged to left shift the output from a multiplier by an amount equal to the input exponent of a texture value and to output the left shifted output from the multiplier to the addition unit.

3. The texture filtering unit according to claim 1, wherein the mode and interleaving counter logic block comprises a counter arranged to count the N clock cycles and trigger the output of a result by the addition unit in the Nth clock cycle of the N clock cycles.

4. The texture filtering unit according to claim 1, wherein the inputs receive i texture values per clock cycle, the texture filtering unit comprises i multipliers and the coefficient merging logic block comprises a further i multipliers.

5. The texture filtering unit according to claim 1, wherein the texture filtering unit is arranged to perform texture filtering using any combination of two or more of: volumetric, anisotropic and trilinear texture filtering methods.

6. The texture filtering unit according to claim 1, wherein the addition unit comprises a fixed-point 3 adder arranged to add together a result of the addition from an immediately previous one of the N clock cycles and two newly received inputs, or a 3:2 compressor followed by a carry-save adder.

7. The texture filtering unit according to claim 1, wherein the interleaving counter logic block is arranged to receive enable signals, wherein the enable signals comprise values that specify whether each filtering method is enabled or not.

8. A graphics processing unit comprising a texture filtering unit as set forth in claim 1.

9. A method of performing texture filtering in hardware logic, wherein the method performs a filtering operation involving textures values input over N clock cycles for each of a plurality of streams of texture values, where N>1, the method comprising:

receiving, in a texture filtering unit, at least two texture values each clock cycle and a plurality of filter coefficients, the plurality of filter coefficients comprising coefficients relating to a combination of at least two of volumetric, anisotropic and trilinear texture filtering methods;

converting the input texture values from floating-point format to a fixed-point significand and an exponent;

generating a single composite filter coefficient for each input texture value from the plurality of filter coefficients comprising coefficients relating to a combination of at least two of volumetric, anisotropic and trilinear texture filtering methods, wherein the single composite filter coefficient is calculated independent of the input texture value;

in each of a plurality of multipliers, multiplying the significand of one of the input texture values by its corresponding single composite filter coefficient, wherein the plurality of multipliers comprises one multiplier for each input texture value received in a clock cycle;

adding together outputs from each of the multipliers, wherein adding together outputs from each of the multipliers comprises:

in a first clock cycle of the N clock cycles for the stream of texture values, adding together outputs from each of the multipliers;

in each of a second clock cycle to a Nth clock cycle of the N clock cycles for the stream of texture values, adding together outputs from each of the multipliers and a result of the addition from an immediately previous one of the N clock cycles for the stream of texture values; and outputting a result of the addition in the Nth clock cycle of the N clock cycles for the stream of texture values;

selecting a mode and controlling operation of the addition unit, wherein the plurality of streams of texture values are interleaved such that in adjacent clock cycles, texture values are input from different streams of texture values;

converting the result from fixed-point format to floating-point format; and outputting the converted result.

10. The method according to claim 9, wherein each input texture value comprises a sign bit, a plurality of exponent bits and a plurality of mantissa bits, wherein converting the input texture values from floating-point format to a fixed-point significand and an exponent comprises: dividing each input texture value into a fixed-point significand and an exponent, wherein the fixed-point significand of each input texture value is input to the corresponding multiplier and the exponent of each input texture value is input to the corresponding left shifting logic block, wherein the fixed-point significand of each input texture value comprises the sign bit and mantissa bits and the exponent of each input texture value comprises the exponent bits, and wherein adding together outputs from each of the multipliers comprises:

for each of the plurality of multipliers, left shifting the output from the multiplier by an amount equal to the input exponent of a texture value and adding together the left shifted outputs from each of the multipliers.

11. The method according to claim 9, wherein the method performs a filtering operation involving texture values input over N clock cycles, where N>1, and wherein adding together outputs from each of the multipliers comprises:

in a first clock cycle of the N clock cycles, adding together outputs from each of the multipliers;

in each of a second clock cycle to a Nth clock cycle of the N clock cycles, adding together outputs from each of the multipliers and a result of the addition from an immediately previous one of the N clock cycles; and outputting a result of the addition in the Nth clock cycle of the N clock cycles.

12. The method according to claim 11, further comprising:

counting the N clock cycles and triggering the output of a result of the addition in the Nth clock cycle of the N clock cycles.

13. The method according to claim 9, further comprising performing texture filtering using any combination of two or more of: volumetric, anisotropic and trilinear texture filtering methods.

14. A graphics processing unit configured to perform the method as set forth in claim 9.

15. An integrated circuit manufacturing system comprising:

a non-transitory computer readable storage medium having stored thereon a computer readable dataset description of an integrated circuit that describes a texture filtering unit;

a layout processing system configured to process the integrated circuit description so as to generate a circuit layout description of an integrated circuit embodying the texture filtering unit; and an integrated circuit generation system configured to manufacture the texture filtering unit according to the circuit layout description, wherein the texture filtering unit is configured to perform a filtering operation involving texture values input over N clock cycles for each of a plurality of streams of texture values, where N>1, and the texture filtering unit comprises:

a plurality of inputs arranged to receive at least two texture values each clock cycle and a plurality of filter coefficients, the plurality of filter coefficients comprising coefficients relating to a combination of at least two of volumetric, anisotropic and trilinear texture filtering methods;

format conversion logic arranged to convert the input texture values from floating-point format to a fixed-point significand and an exponent;

a coefficient merging logic block arranged to generate a single composite filter coefficient for each input texture value from the plurality of filter coefficients comprising coefficients relating to a combination of at least two of volumetric, anisotropic or trilinear texture filtering methods, wherein the single composite filter coefficient is calculated independent of the input texture value;

one multiplier for each input texture value, wherein each multiplier is arranged to multiply the significand of one of the input texture values by its corresponding single composite filter coefficient;

an addition unit arranged, for each of the streams of texture values:

in a first clock cycle of the N clock cycles for the stream of texture values, to add together outputs from each of the multipliers;

in each of a second clock cycle to a Nth clock cycle of the N clock cycles for the stream of texture values, to add together outputs from each of the multipliers and a result of the addition from an immediately previous one of the N clock cycles for the stream of texture values; and to output a result of the addition in the Nth clock cycle of the N clock cycles for the stream of texture values;

a mode and an interleaving counter logic block arranged to control operation of the addition unit such that in adjacent clock cycles, texture values are input from different streams of texture values to interleave the plurality of streams of texture values;

hardware logic arranged to convert an output from the addition unit from fixed-point format to floating-point format; and an output arranged to output the converted output from the addition unit.

* * * * *